United States Patent [19]

Davenport et al.

[11] Patent Number: 4,830,516

[45] Date of Patent: May 16, 1989

[54] ROLLER BEARING

[75] Inventors: Carl Davenport, Harwinton; Richard Murphy, Torrington, both of Conn.

[73] Assignee: The Torrington Company, Torrington, Conn.

[21] Appl. No.: 236,485

[22] Filed: Aug. 25, 1988

[51] Int. Cl.⁴ .................... F16C 29/06; F16D 3/30
[52] U.S. Cl. ............................ 384/44; 384/45; 464/111; 464/168
[58] Field of Search ..................... 384/43–45, 384/50, 54–56, 563, 564, 569; 464/111, 168, 167

[56] References Cited

U.S. PATENT DOCUMENTS 3,501,209  3/1970  Ende ............................ 384/563
4,729,670  3/1988  Murphy et al. ............... 384/44
4,768,990  9/1988  Farrell et al. ............ 384/44 X Primary Examiner—Thomas R. Hannon
Attorney, Agent, or Firm—Frank S. Troidl

[57] ABSTRACT

The bearing may be used in the housing of a constant velocity universal joint such as a front-wheel universal joint drive for motor vehicles. The bearing has a generally rectangular roller block provided with raceways around its entire periphery. Rollers fill all of the raceways. The ends of the raceways are defined by a pair of flexible end plates. The end plates yieldingly guide the roller ends.

3 Claims, 2 Drawing Sheets 4,830,516

ROLLER BEARING

This invention relates to rolling contact bearings for machine parts or units where the bearing is constructed for straight-line motion and some angular motion. More particularly, this invention is a roller bearing which is useful, among other things, in a front wheel universal joint drive for motor vehicles.

The operation of certain machines which include relatively movable parts often requires that one part have linear movement and also have angularity with respect to a second part. Often, it is necessary that when an anti-friction bearing is used on one part the bearing has straight raceways containing rollers in operational contact with raceways in a second machine part. For example, in many front-wheel drive passenger cars, the engine transfers power through a transmission to a drive shaft. The torque is transmitted to driven shafts through constant velocity torque transmitting universal joints. The universal joint includes a housing connected to the drive shaft, with the housing having three circumferentially equally separated pairs of parallel raceways. The driven shaft includes three circumferentially equally spaced apart rectangular shaped anti-friction bearings, each having opposite straight raceways and rollers in contact with universal joint housing outer races. The bearings are constructed to permit linear motion of the driven shaft with respect to the housing and also angularity of the shaft with respect to the housing.

A currently made roller bearing which is used in a front-wheel universal joint drive for motor vehicles is described in U.S. Pat. No. 4,729,670, dated Mar. 8, 1988, issued in the name of Richard F. Murphy and entitled "Roller Bearing". The thrust surfaces for the roller ends in the bearing shown in U.S. Pat. No. 4,729,670 are rigid members. The rigid members are either part of the roller block or attached to the roller block. The result is that the rollers cannot move in an axial direction more than the initial clearance present between the ends of the rollers and the rigid members. The resulting slippage against the roller makes the U-joint "feel" less than perfect. This is often evidenced by a "shudder". This "shudder" occurs in the steering wheel.

This invention uses a pair of thin formed and hardened plates to be contacted by and guide the roller ends. The plates are firmly attached to the roller block only at their inboard portions. The outboard portions, where the rollers contact, are free to flex outward the small distance the rollers are forced to move. The result is a reduction in roller slippage and a reduction in shudder.

Briefly described, the bearing has a generally rectangular roller block with raceways around its periphery. A sufficient number of rollers to completely occupy the raceways, but loose enough to permit rolling contact with the raceways are mounted around the raceways. The rollers are retained in the roller block by at least one roller retainer. A pair of separated flexible end plates define the ends of the raceways adjacent the ends of the rollers for guiding the rollers.

The invention, as well as its many advantages, may be further understood by reference to the following detailed description and drawings in which.

In the various figures, like parts are referred to by like numbers.

Figure 1:
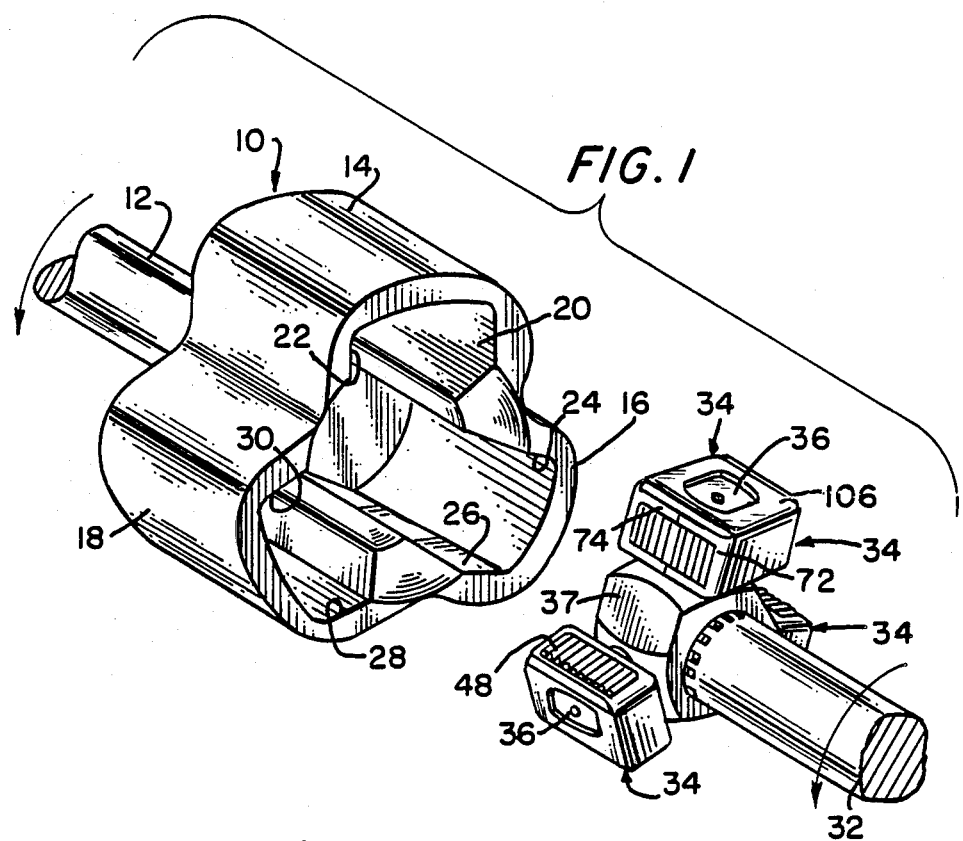
FIG. 1 is an exploded view of a constant velocity universal joint and illustrates one manner in which the new bearing may be used.

Referring to the drawings and more particularly to FIG. 1, the constant velocity universal joint includes a housing 10 rotated by drive shaft 12. The drive shaft 12 might be, for example, rotated by the transmission of a front-wheel drive vehicle. The housing 10 includes three circumferentially equally spaced lobes 14, 16 and 18, serving as races. Race 14 has circumferentially separated straight raceways 20 and 22. Race 16 has circumferentially separated straight raceways 24 and 26. Race 18 has circumferentially separated straight raceways 28 and 30.

The drive shaft 12 rotates housing 10 which rotates a spider on driven shaft 32. Three circumferentially equally spaced bearings 34 are each mounted on one of three circumferentially equally spaced bearing supports 36 extending radially from a spider member 37 connected to the driven shaft 32. The driven shaft 32 may be connected, for example to a constant speed universal joint for driving a front-wheel of a passenger car.

As can be seen by referring to the arrows in FIG. 1, the drive shaft 12 rotates the driven shaft 32 in the direction of the curved arrow while at the same time permits the driven shaft 32 to move linearally in either direction along the spaced apart raceways in the outer races 14, 16, and 18. Also, the arrangement permits angular movement of the driven shaft 32 in the housing 10.

Figure 2:
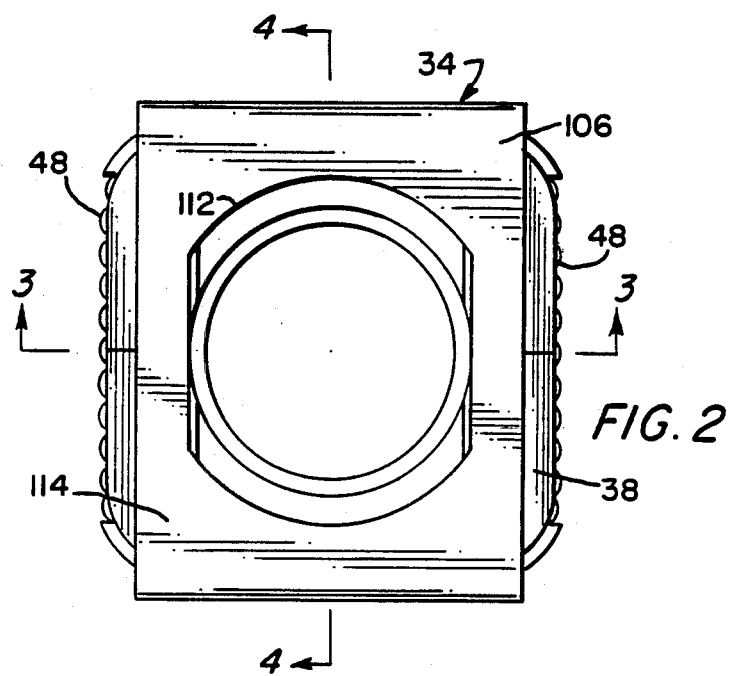
FIG. 2 is a top view of a preferred embodiment of the invention.
Figure 3:
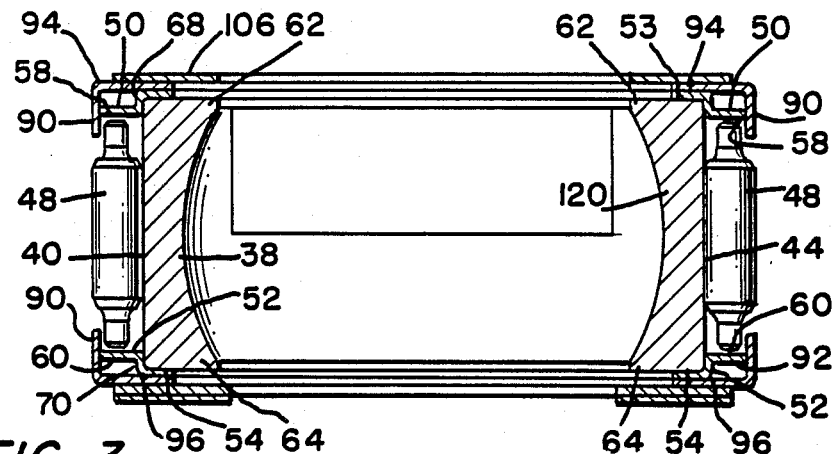
FIG. 3 is a sectional view taken along lines 3—3 of FIG. 2 and in the direction of the arrows.
Figure 4:
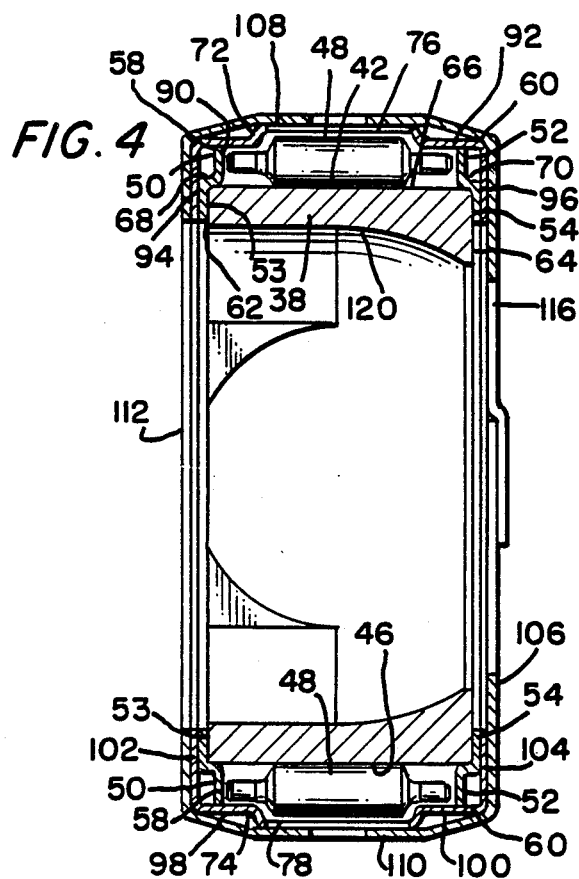
FIG. 4 is a sectional view taken along lines 4—4 of FIG. 2 and in the direction of the arrows.

Referring to FIGS. 2 through 4, inclusive, each bearing 34 includes a generally rectangularly shaped roller block 38. The entire outer periphery of the roller block 38 serves as roller raceways. Thus, there are four straight raceway outer surfaces 40, 42, 44, and 46 (see FIG. 3 and FIG. 4).

A plurality of trunnion rollers 48 completely surround the periphery of the roller block 38. There are a sufficient number of trunnion rollers 48 to completely occupy the raceways. However, the trunnion rollers 48 are loose enough to permit rolling contact with the raceways.

The rollers 48 are axially retained in the roller block 38 by a pair of axially separated outwardly extending flexible end plates 50 and 52, one flexible end plate at each axial end of the roller block 38 extending around the entire periphery of the roller block 38. The flexible end plates are located adjacent the axial ends of the trunnions 48. Thus, the flexible end plates 50 and 52 define the ends of the raceways for guiding the rollers.

The inboard portions 53 and 54 of flexible end plates 50 and 52, respectively, are firmly attached to the generally rectangular roller block 38 and the outboard portions 58 and 60, respectively, are free to flex in the roller axial direction. The inboard portions 53 and 54 of each flexible end plate 50 and 52, respectively, overlap the end surfaces 62 and 64, respectively, of the rectangular roller block 38. The outboard portions 58 and 60 of each flexible end plate 50 and 52, respectively, are longitudinally spaced from the inboard portions 53 and 54, respectively, and extend outwardly from the generally rectangular roller block outer surface 66. The outboard and inboard portions of the flexible end plates 50 and 52 are interconnected by flexible end plate portions 68 and 70, respectively, which overlap the outer surface 66 of the generally rectangular roller block 38.

At least one, and preferably two, roller retainers 72 and 74 (see FIG. 1) are mounted over opposite raceways. Referring to FIG. 4, each roller retainer 22 and 74 has a roller enclosing portion 76 and 78, respectively. The inside surfaces of roller enclosing portions 76 and 78 retain the rollers in the bearing which are not in the exposed operating positions for contact with an outer raceway such as the outer raceways in the housing 10 (see FIG. 1) of the universal joint. The unexposed rollers are on raceway 42 and 46. Referring to FIG. 3, opposite straight raceways 40 and 44 contain trunnion rollers 48 which are in the exposed operating positions for contact with an outer raceway.

Roller retainer 72 has a pair of rims 90 and 92 and a pair of flanges 94 and 96, integral with rims 90 and 92, respectively. Roller retainer 74 has a pair of rims 98 and 100 and a pair of flanges 102 and 104, integral with rims 98 and 100, respectively. The rims retain the rollers on the raceways and keep those rollers 48 in the exposed operating positions from falling out of the bearing.

The flanges firmly contact the inboard portions 53 and 54 of the flexible end plates 50 and 52, respectively. The outer portions of the flanges are spaced from the outboard portions 58 and 6 of the flexible end plates 50 and 52 so that the outboard portions are free to flex outward the small distance the rollers may be forced to move axially. The result is a reduction in roller slippage and a reduction in shudder in the steering wheel.

A rectangular sleeve 106 fits over the roller retainers 72 and 74 to keep the retainers in place (see FIG. 1). Sleeve 106 has opposite open sides. One open side is adjacent to roller block straight raceway 40, with its rollers 48 in operating positions; the other open side is adjacent to the roller block straight raceway 44, with its rollers 48 in the exposed operating positions (see FIG. 3). Opposite sides 108 and 110 of the sleeve 106 fit over the roller enclosing portions 76 and 78, respectively, of the roller retainers 72 and 74, respectively (see FIG. 4).

A centrally located opening 112 on the top 114 of the sleeve and a centrally located opening 116 in the bottom 118 of the sleeve are aligned with the central bore 120 of the roller block 38. Thus, the assembled bearing may be mounted over a bearing support 36 of the spider member 37 (see FIG. 1).

I claim:

1. A bearing comprising: a generally rectangular roller block bearing having raceways around its periphery; a sufficient number of rollers to completely occupy the raceways, but loose enough to permit rolling contact of the rollers with the raceways; at least one roller retainer for retaining the rollers on the raceways; and a pair of separated flexible end plates defining the ends of the raceways for guiding the rollers, the inboard portions of the flexible end plates being firmly attached to the generally rectangular roller block and the outboard portions of the flexible end plates being free to flex.

2. A bearing in accordance with claim 1 wherein: said at least one roller retainer also retains the flexible end plates in the bearing.

3. A bearing in accordance with claim 2 wherein: the inboard portion of each flexible end plate overlaps an end surface of the generally rectangular roller block, the outboard portion of each flexible end plate is longitudinally spaced from the inboard portion and extends outwardly from the generally rectangular roller block outer surface, the outboard and inboard portions being interconnected by a flexible end plate portion overlapping the generally rectangular roller block outer surface; and the at least one roller retainer having flanges firmly contacting the inboard portions of the flexible end plates, the flange being spaced from the outboard portions of the flexible end plates.

* * * * *